Oct. 27, 1964    HACHIRO IKEDA ETAL    3,154,407
METHOD FOR MANUFACTURING ALUMINUM
Filed Oct. 26, 1961
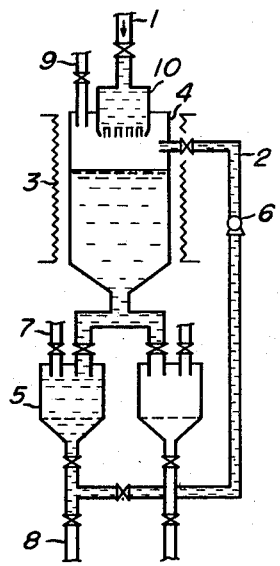
Hachiro Ikeda
Juntaro Yurimoto
Hirosuke Ryu
INVENTORS
BY
Stevens, Davis, Miller & Mosher
ATTORNEYS 3,154,407
METHOD FOR MANUFACTURING ALUMINUM
Hachiro Ikeda, Naka-ku, Nagoya, and Juntaro Yurimoto and Hirosuke Ryu, Niihama-shi, Japan, assignors to Sumitomo Chemical Company, Ltd., Osaka, Japan, a corporation of Japan
Filed Oct. 26, 1961, Ser. No. 147,786
Claims priority, application Japan, Oct. 29, 1960, 35/43,546
17 Claims. (Cl. 75—68)

This invention relates to the method for manufacturing aluminum. More particularly, it relates to the method for manufacturing aluminum, together with olefin and hydrogen, by thermal decomposition or pyrolysis of a complex compound of an alkylaluminum compound having the general formula of $(R^1R^2-CH-CH_2)_2AlY$, wherein $R^1$ and $R^2$ are respectively selected from the group consisting of hydrogen atom and alkyl radical and $Y$ is selected from the group consisting of $R^1R^2-CH-CH_2-$ radical and hydrogen atom.

K. Ziegler et al. have suggested a method for manufacturing high purity aluminum by thermal decomposition or pyrolysis of alkylaluminum compound. (See, for example, Angew. Chem., vol. 67, No. 16, pages 424–425 (1955); British Patent No. 788, 619; Japanese patent publication No. SHO 32–2,454.) According to their method, the single alkylaluminum compound is merely decomposed by being heated in the liquid state. In such method, however, it is extremely difficult to recover, wash and dry the deposited aluminum in the complete absence of air to obtain the final product. This is true especially when the continuous process is contemplated.

When the decomposition is effected in vacuo in the gaseous state according to their method, there are also some difficulties from technical and economical points of view, in maintaining the apparatus of commercial scale in a vacuum state. Thus, leakage of a larger amount of air tends to cause danger of inflammation of the alkylaluminum compound, and leakage of even a smaller amount of air tends to lower the purity of aluminum due to formation of byproducts, such as aluminum carbide, as set forth in the following Table 1.

TABLE 1

| | | | | |
|---|---|---|---|---|
| Air content in the gaseous atmosphere (percent) | 0.0 | 5.0 | 10.0 | 25.0 |
| Aluminum carbide content in the metal produced (percent) | 0.0 | 1.2 | 2.0 | 8.9 |

K. Ziegler et al. have also suggested an attempt to accomplish the same effects as in the gaseous state decomposition by blowing a larger amount of hydrogen into an alkylaluminum compound and deriving the vapor of said compound accompanied with the hydrogen onto a heated surface to cause the decomposition. According to this attempt, however, a part of the alkylaluminum compound is not avoidable from denaturization, which seems to be caused by oxygen or moisture included in the hydrogen in an unavoidably minute amount, to form denatured alkylaluminum compounds which could not isolate pure aluminum.

In these gaseous state decomposition methods, also, continuous separation of the resulting aluminum is much difficult, because the aluminum is deposited on a heated surface and forms a film or a mirror which is difficultly removed. Besides, the heat conductivity becomes worse by such film or mirror as time elapses, thereby the heat control becoming difficult.

Furthermore, K. Ziegler et al. have suggested possibility of a continuous operation by blowing the vapor of an alkylaluminum compound onto the surface of molten aluminum, whereby permitting the decomposition of the compound on the liquid aluminum, and taking out the increment directly from the molten aluminum. It is, however, apparent from the old publications that there might occur a thermal cracking reaction of the olefin produced, which may cause contamination of carbon in the aluminum, or other unfavorable side reactions, at such temperature as aluminum is molten, i.e. at about 700° C. or higher. (See, for example, G. Egloff; "The Reactions of Pure Hydrocarbons," pages 336–340 (1937).) Thus, this method could not give sufficiently pure aluminum with favorable yield.

As mentioned above, the conventional methods of thermal decomposition of alkylaluminum compounds have not succeeded in continuous production of high purity aluminum in commercial scale with easy and economical procedure. A method comprising dissolving or dispersing an alkylaluminum compound into a thermally stable inert organic solvent, and heating the solution, or adding the compound into a heated solvent to carry out the decomposition of the said compound, appears to almost completely solve the aforementioned problems. In this method, however, a considerably larger amount of the solvent is required to make the solvent display the effect thereof as a medium, and this fact will result in extremely unfavorable problems of providing a larger volume of each part of the apparatus and requiring a larger amount of heating energy.

The present inventors have found that the above mentioned disadvantages could completely be avoided by a method of heating a complex compound of alkylaluminum compound up to its decomposition temperature.

As a result of extensive studies, the inventors have found that, as the complex compound of alkylaluminum compound has a smaller chemical reactivity than that of alkylaluminum per se, the former is hardly influenced by active substances, such as oxygen and moisture, possibly included in the atmosphere of reactor in a minute amount, and consequently suffers from a smaller degree of denaturization than in the latter case. Also, reaction of the complex compound of alkylaluminum compound is moderate, as compared with that of alkylaluminum compound per se, so that the temperature control in the thermal decomposition process is extremely easy, and the side reactions due to local overheating can be avoided. Furthermore, the amount of reaction mass is generally smaller, when compared with the case of using an organic solvent as the reaction medium, whereby the scale of reaction apparatus being comparatively smaller.

Thus, an object of the invention is to provide a method for manufacturing aluminum of much higher purity by a simple operation than in the conventional methods. Another object is to provide such method as is carried out under the easily controllable and moderate conditions. Still another object is to provide such method for manufacturing aluminum, as can easily be applicable to a continuous process. Other objects and advantages would be apparent from the following description.

To accomplish these objects, the present invention provides a method for manufacturing aluminum which comprises heating a complex compound of an alkylaluminum compound having the general formula of $$(R^1R^2CH-CH_2)_2AlY$$

wherein $R^1$ and $R^2$ are respectively selected from the group consisting of hydrogen atom and alkyl radical, and Y is selected from the group consisting of $$R^1R^2CH-CH_2-$$

radical and hydrogen atom, more particularly a complex compound of (A) an alkylaluminum compound as identified above, with (B) a compound selected from the group consisting of alkali metal compounds having the general formula of MZ, wherein M stands for an alkali metal, and Z is selected from the group consisting of alkyl radical, hydrogen atom, halogen atom and ⅓ $AlF_6$ radical; ethers having the general formula of $R^3R^4O$, wherein $R^3$ and $R^4$ are respectively selected from hydrocarbon radical, the $R^3$ and $R^4$ being optionally directly linked to form cyclic ether, and polyethers having 2 to 3 oxide linkages in a hydrocarbon molecule; amines having the general formula of $R^5R^6R^7N$, wherein $R^5$, $R^6$ and $R^7$ are respectively selected from the group consisting of hydrogen atom and hydrocarbon radical; and quaternary ammonium salts having the general formula of $$R^8R^9R^{10}R^{11}NX$$

wherein $R^8$, $R^9$, $R^{10}$ and $R^{11}$ are respectively selected from alkyl radical, and X stands for halogen atom; up to a temperature at which said complex compound is decomposed.

As to the alkylaluminum compound to be decomposed according to the present invention and having the general formula of $(R^1R^2CH-CH_2)_2AlY$, wherein $R^1$, $R^2$ and Y have the same meanings as indicated above, such compound as triethylaluminum, diethylaluminum hydride, tri-n-propylaluminum, di-n-propylaluminum hydride, tri-n-butylaluminum, di-n-butylaluminum hydride, triisobutylaluminum, diisobutylaluminum hydride, tri(2-methyl-butyl)aluminum, di(2-methyl-butyl)aluminum hydride, tri(2-methyl-pentyl)aluminum, di(2-methyl-pentyl)aluminum hydride and the like, may practically be employed. Of course, a mixture of more than 2 of them may be employed. Among these compounds, triisobutylaluminum, diisobutylaluminum hydride, and a mixture thereof, are the most favorable.

A compound to form the said complex compound together with the above mentioned alkylaluminum compound, may conveniently be explained separately according to the following groups.

The first group is an alkali metal compound having the general formula of MZ, wherein M stands for alkali metal, and Z is selected from the group consisting of alkyl radical, hydrogen atom, halogen atom, and ⅓ $AlF_6$ radical. As for favorable compounds belonging to the said group, such compounds are included as ethylsodium, sodium fluoride, sodium hydride, potassium fluoride, lithium hydride, cryolite, and the like.

The second group includes ethers having the general formula of $R^3R^4O$, wherein $R^3$ and $R^4$ are respectively selected from hydrocarbon radical, the $R^3$ and $R^4$ being optionally directly linked to form cyclic ether, and polyethers having 2 to 3 oxide linkages in a hydrocarbon molecule. In these ethers and polyethers, the ones containing 2 to 20 total carbon atoms are advantageously employed. In general, alkyl, cycloalkyl, aryl, and aralkyl ethers are conveniently used. Preferable examples of the said ethers and polyethers are diethyl ether, di-n-propyl ether, di-n-butyl ether, diisobutyl ether, diisoamyl ether, isopropyl n-butyl ether, dioctyl ether, diphenyl ether, benzyl ethyl ether, vinyl methyl ether, divinyl ether, anisole, phenethole, tetrahydrofuran, dioxan, and the like.

The third group is amines having the general formula of $R^5R^6R^7N$, wherein $R^5$, $R^6$ and $R^7$ are respectively selected from the group consisting of hydrogen atom and hydrocarbon radical. Preferable examples of the said amines are triethyl amine, diethylisopropyl amine, triisopropyl amine, tri-n-propyl amine, tri-n-butyl amine, N,N-dimethylaniline and the like.

The fourth group is quaternary ammonium salt having the general formula of $R^8R^9R^{10}R^{11}NX$, wherein $R^8$, $R^9$, $R^{10}$ and $R^{11}$ are respectively selected from alkyl radical, and X stands for halogen atom. Typical examples of this group are tetraethylammonium iodide, tetra-n-propylammonium chloride, n-butyltrimethylammonium bromide and the like.

The compound which forms complex compound with the alkylaluminum compound may be employed alone, but if necessary, may also be utilized in the form of a mixture of more than 2 members belonging either to the same group or to the different groups.

Some of these complex compounds have been reported by K. Ziegler et al. (see, for example, German Patent No. 931,107 and No. 925,348), and may be prepared according to their methods. For example, $$NaF \cdot 2[(iso\text{-}C_4H_9)_3Al]$$

is obtained as a clear, uniform liquid by mixing 198 g. (1 mol) of triisobutylaluminum with 21 g. (½ mol) of dried sodium fluoride power in nitrogen atmosphere, and by heating the mixture under stirring at a temperature of between 130° and 140° C. This complex compound solidifies at 35° C., and melts again by heating. As for another example, when n-butyl ether (B.P. 141° C.) is mixed with equimolar weight of triisobutylaluminum in nitrogen atmosphere, a slightly exothermic reaction occurs to give a uniform liquid of $(n\text{-}C_4H_9)_2O \cdot (iso\text{-}C_4H_9)_3Al$. This compound does not boil until a temperature at which said compound is decomposed. It may obviously be known to those skilled in the art that other complex compounds may easily be prepared similarly with the above mentioned method.

In the present invention, the above said complex compound is heated to a temperature at which said compound is decomposed to isolate aluminum. The temperature somewhat varies depending upon the kind of complex compound employed and the reaction conditions. In general, the decomposition reaction of the invention starts from about 180° C., but the heating temperature may preferably be selected within the range from about 200° C. to 250° C. While, the heating temperature of above 300° C. is to be avoided, since unfavorable by-products may be formed at such temperature.

During the course of the present reaction, the decomposition of such complex compound seems to trace the complicated steps. At any rate, the advantage of the present invention could be realized by using the aforementioned complex compound as a starting reaction solution.

Although the method of the invention may be conducted by substantially completely decomposing the complex compound in the reactor and taking aluminum out of the decomposition products, the method of the invention may further advantageously be effected by decomposing the complex compound in the reactor, and after beginning of isolation of aluminum, adding, preferably continuously, an amount of alkylaluminum compound corresponding to the amount of consumption thereof, to the reactor to maintain the liquid composition substantially constant.

Speaking the method more practically, the complex compound is at least partially decomposed in the reactor, and thus produced aluminum is taken out from the reactor continuously together with the flow of reaction mass to separate aluminum therefrom by, for example, filtration. After separating aluminum, the reaction mass (containing complex forming compound) is recycled to the reactor, and, on the other hand, an amount of alkylaluminum compound corresponding to the amount of consumption (that is, corresponding to the amount of complex forming compound) is continuously added to the reactor. Or, a fresh alkylaluminum compound may be added to the reaction mass, which has been withdrawn from the reactor and already been separated out from aluminum (containing complex forming compound), to make complex compound, and then the mixture may be recycled to the reactor. Furthermore, such method may also advantageously be employed as that the complex compound is heated to a temperature at which said compound is decomposed, in a reactor, and thus produced aluminum as reaction proceeds is continuously or intermittently taken out, or scraped up, leaving the medium in the reactor, while an amount of alkyl aluminum compound corresponding to the amount of consumption is continuously added to the reactor. In this case, the form and the composition of the reaction mass to be recycled may vary in accordance with the kind of raw material and with the decomposition temperature employed. Consequently, the reaction mass remaining within the reactor has not always the same form of complex compound with that at the starting stage, but there will be no trouble in practicing the present invention by using such reaction mass. The alkylaluminum compound in the reactor may, in some cases, be present partly in the free form and may be subjected to the thermal decomposition as it is. However, it is not desirable that such free alkylaluminum compound is present in an amount of about 20% or more in the reaction mass, because it results in the deterioration of quality of aluminum. The complex forming compound to be reacted with the alkylaluminum compound has no influence upon the reaction even if it is present in an excess amount in the reactor.

Upon heating the complex of the alkylaluminum compound up to the decomposition temperature, aluminum is readily isolated in the reaction system and, at the same time, olefin and hydrogen gas are generated. Thus produced aluminum is obtained as a thin film adhered on the wall of reactor at the early stages of reaction but, as the isolation of aluminum proceeds, the aluminum is grown in a particle size and is easily fallen off from the said wall. If in this case a small amount of aluminum powders, particles, or small pieces are added in the reactor as seeds for growing aluminum, the isolation of aluminum on the wall can completely be avoided, and aluminum having considerably large form and uniform particle size can be obtained.

In some cases, it is advantageous to preliminarily seed finely divided aluminum powders in the reaction mass to be decomposed. This serves for formation of aluminum of comparatively larger and uniform particle size without adhering onto the wall of reactor. The seed aluminum powder may be added directly to the reactor, or may be preliminarily mixed with the material alkylaluminum compound and/or the recycled reaction mass, preferably in a mixing vessel, the latter being advantageously equipped with a stirrer.

During the decomposition reaction, olefin and hydrogen gas are generated. The olefin has correspondingly the formula of $R^1R^2C=CH_2$, wherein $R^1$ and $R^2$ are the same meanings as in the material alkylaluminum compound. The amounts of the generated olefin and hydrogen gas are almost quantitative, so that the proceed of the decomposition reaction can be traced through measurement of the gas volume. The gases are advantageously reused as the materials for preparation of alkylaluminum compounds.

If desired, the decomposition reaction of the invention is advantageously carried out under introduction of an inert gas, such as hydrogen and argon, to drive the generated olefin gas out of the reaction mixture, thereby to accelerate the decomposition reaction. Furthermore exhaustion of the generated gas mixture can be helped by carrying out the reaction under a weak subatmospheric pressure.

In order to control the temperature and the viscosity of the reaction mass, a medium, such as hydrocarbon, ethers, and amines, may successfully be employed to mix with the complex compound in the present invention, if desired. The medium should have a higher boiling point than the decomposition temperature of the complex compound. In mixing the medium with the complex compound, any mixing ratio may be utilized, but the same amount of the medium as that of the compound, or the less, may preferably be employed to admix with the complex compound to make the dispersion, thereafter the dispersion is subjected to the thermal decomposition reaction.

The aluminum produced by the thermal decomposition method of the present invention is taken out from the reactor, washed with saturated hydrocarbon having a lower boiling point, such as hexane and heptane, and dried.

Thus, the aluminum having such higher purity as shown in the following Table 2 could be obtained.

TABLE 2

| Component | Fe | Si | Al |
|---|---|---|---|
| Composition (Percent) | 0.001 | 0.002 | More than 99.99. |

The appended drawings are for the purpose of indicating a favorable mode of practice of the present invention, thereby the invention will more fully be understood. In FIG. 1, an alkyl aluminum compound is introduced through the inlet pipe 1 into the distributor 10 having a number of nozzles at the bottom part, therethrough an amount of alkylaluminum compound corresponding to the amount of consumption caused by the thermal decomposition is added to the reactor 4 drop by drop. In the reactor 4, the alkylaluminum compound is combined with the complex forming compound, which is recycled through the inlet pipe 2 and is somewhat changed in its form and its composition by the thermal decomposition, to give regenerated complex compound and then the complex is subjected to decomposition to isolate aluminum. In general, the regeneration of the complex compound is carried out so rapidly at the temperature at which the complex is decomposed that it is needless to provide the mixer beyond the reactor to promote the regeneration of the complex compound. If the mixer is set up, a small one may suffice. The amount of alkylaluminum compound to be added may easily be controlled by means of the valve connected to the inlet pipe 1. The isolated aluminum, which is thermally decomposed in the reactor 4 heated by the heater 3, is sent, along with the flow of the reaction mass, to one of the two filters 5 installed in parallel, where the aluminum is filtered to be separated from the reaction mass.

The filtrate is sent again to the reactor 4 through the inlet pipe 2 by means of the pump 6. Gas mixture generated during the decomposition is exhausted through an outlet pipe 9. When a sufficient amount of aluminum is separated in the filter which is being operated now, that filter is changed to the other filter. To the first filter containing aluminum, an inert gas is sent through the inlet pipe 7 to flow out the reaction mass remaining in the filter through the outlet pipe 8, and thereafter, a lower boiling saturated hydrocarbon solvent, such as n-hexane, is poured through the inlet pipe 7 to the filter to remove the reaction mass adhered to the aluminum by washing, followed by recovery of the aluminum. In the said way, aluminum can be taken out exceedingly easily by alternative use of the two filters, thus the charge of the materials, the decomposition reaction and the separation of aluminum, can be carried out continuously.

The invention will more fully be described with respect to the following examples, which, however, are set forth merely by way of illustration and not by way of limitation.

Example 1

The space portion of a four-necked flask having a thermometer, a dropping funnel, a stirrer and an outlet glass tube connected to a gas tank, was substituted with nitrogen atmosphere. Into the flask, 43.8 grams of the complex compound of sodium fluoride and triisobutylaluminum (in mol ratio of 1:2), was charged, and 19.8 g. of triisobutylaluminum was charged into the dropping funnel. The flask was heated gradually at the bottom by means of a flask-heater up to 220° C. The complex compound was decomposed with generation of a gas mixture, and aluminum was isolated in the reaction mass in the form of film in the earlier stage of the decomposition and in the form of silver-white granules in the later stage of the decomposition. Observing the amount of generated gas, an amount of triisobutylaluminum corresponding to the amount of consumption was added to the flask through the dropping funnel, thereby the reaction mass in the flask was maintained in a definite composition.

After adding the triisobutylaluminum through the dropping funnel, the heating was discontinued. The yield of aluminum and that of gas were 2.8 g. and 10.4 liters (at 0° C. and 1 atm.) respectively, the composition of the gas being 66.5% of isobutylene, 32.5% of hydrogen, and 1.0% of isobutane.

The similar procedures were repeated by use of the equivalent amounts of potassium fluoride, sodium hydride, ethylsodium, lithium hydride, and cryolite, respectively, in place of the sodium fluoride in the above-mentioned procedure, with the same results.

Example 2

Employing the same apparatus as disclosed in Example 1, the space portion of the four-necked flask was substituted with nitrogen atmosphere. To the flask, 32.8 g. of the complex compound of diisobutyl ether and triisobutylaluminum (in mol ratio of 1:1), was charged, and 39.6 g. of triisobutylaluminum was charged into the dropping funnel. The flask was heated gradually at the bottom by means of a flask-heater up to 220° C.

The complex compound was decomposed with generation of a gas mixture, and aluminum was isolated in the reaction mass in the form of brittle, silver white granules. The generated gas was collected to a gas tank to measure the amount thereof, and basing upon the amount of generated gas as a standard, an amount of triisobutylaluminum corresponding to the amount of consumption was added into the flask through the dropping funnel to keep the composition of the complex in the flask constant. After adding the total amount of triisobutylaluminum through the funnel, the heating was discontinued. The yield of aluminum and that of gas were 5.4 g. and 20.1 liters respectively, the composition of the gas being 65.8% of isobutylene, 33.4% of hydrogen, and 0.8% of isobutane.

Employing the same apparatus and the same procedures as the above-described, the decomposition reactions were carried out by use of complex compounds of triisobutylaluminum with anisole, benzyl ethyl ether, diphenyl ether, tetrahydrofuran, and dioxan, respectively. The results obtained are tabulated below.

| Complex forming compound | Weight of the complex compound (g.) | Weight of triisobutylaluminum dropped (g.) | Decomposition temperature (° C.) | Yield of isolated aluminum (g.) | Volume of generated gas (liter, at 0° C. 1 atm.) |
|---|---|---|---|---|---|
| Anisole | 30.6 | 19.8 | 225 | 2.6 | 10.0 |
| Benzyl ethyl ether | 33.4 | 19.8 | 230 | 2.6 | 9.8 |
| Diphenyl ether | 36.8 | 19.8 | 230 | 2.7 | 10.1 |
| Tetrahydrofuran | 27.0 | 19.8 | 225 | 2.6 | 10.3 |
| Dioxan | 28.6 | 19.8 | 220 | 2.7 | 10.1 |

Example 3

Employing the same apparatus as disclosed in Example 1, the space portion of the four-necked flask was substituted with nitrogen atmosphere. 18.8 g. of the complex compound of diethyl ether and triethylaluminum (in mol ratio of 1:1) was charged into the flask, and 0.3 g. of finely divided aluminum powder was added thereto, while 11.4 g. of triethylaluminum was charged into the dropping funnel. The flask was heated gradually at the bottom by means of a flask-heater up to 230° C. The complex compound was decomposed with generation of a gas mixture, and aluminum was isolated in the reaction mass in the form of silver white granules having uniform particle size. The amount of the gas generated in the course of the decomposition and collected into a gas tank was measured with a gas meter, while, basing upon the amount of generated gas, an amount of triethyl aluminum corresponding to the amount of consumption was added through the dropping funnel into the flask. After dropping the total amount of triethylaluminum, the heating was discontinued. The yield of aluminum and that of gas were 2.9 g. and 9.9 liters (at 0° C. and 1 atm.) respectively, the composition of gas being 66.5% of ethylene, 32.9% of hydrogen, and 0.6% of ethane.

Example 4

Employing the same apparatus as disclosed in Example 1, the space portion of the four-necked flask was substituted with nitrogen atmosphere. Into the flask, 54.4 g. of the complex compound of di-n-butyl ether and diisobutylaluminum hydride (in mol ratio of 1:1) was charged and 28.4 g. of diisobutylaluminum hydride was charged into the dropping funnel. The flask was heated gradually at the bottom up to 230° C. The complex compound was decomposed with generation of a gas mixture, and aluminum was isolated in the reaction mass in the form of brittle, silver white granules. The gas was collected into a gas tank and measured with a gas meter, while, basing upon the amount of generated gas, an amount of diisobutylaluminum hydride corresponding to the amount of consumption thereof was added through the dropping funnel to the flask. After dropping the total amount of diisobutylaluminum hydride, the heating was discontinued. The yield of aluminum and that of gas were 5.4 g. and 15.4 liters (at 0° C. and 1 atm.) respectively, the composition of gas being 57.1% of isobutylene, 42.6% of hydrogen and 0.3% of isobutane.

Example 5

Employing the same apparatus as disclosed in Example 1, the space portion of the four-necked flask was substituted with nitrogen atmosphere. 38.3 g. of the complex compound of tri-n-butyl amine and triisobutylaluminum (in mol ratio of 1:1) was charged into the flask, and 19.8 g. of triisobutylaluminum was charged into the dropping funnel. The flask was heated gradually at the bottom by means of a flask-heater up to 220° C. The complex compound was decomposed with generation of a gas mixture, and aluminum was isolated in the reaction mass in the form of film in the earlier stage of the decomposition and in the form of gray granules in the later stage. The gas was collected into a gas tank and measured, while, basing upon the amount of generated gas, an amount of triisobutylaluminum corresponding to the amount of consumption was added to the flask through the dropping funnel. After adding the total amount of triisobutylaluminum, the heating was discontinued. The yield of aluminum and that of gas were 2.6 g. and 9.8 liters (at 0° C. and 1 atm.) respectively, the composition of gas being 66.5% of isobutylene, 32.8% of hydrogen and 0.7% of isobutane.

Example 6

Employing the same apparatus as disclosed in Example 1, the space portion of the four-necked flask was substituted with nitrogen atmosphere. To the flask and the dropping funnel, 65.2 g. of the complex compound of tetraethylammonium iodide and triisobutylaluminum (in mol ratio of 1:2) and 19.8 g. of triisobutylaluminum were charged respectively. The flask was gradually heated at the bottom up to 230° C. The complex compound was decomposed with generation of a gas mixture, and aluminum was isolated in the reaction mass in the form of black-gray powders. Basing upon the amount of generated gas, triisobutylaluminum was added to the flask through the dropping funnel. After dropping the total amount of triisobutylaluminum, the heating was discontinued. The yield of aluminum and that of gas were 2.5 g. and 9.6 liters (at 0° C. and 1 atm.) respectively, the composition of gas being 66.5% of isobutylene, 33.0% of hydrogen, and 0.5% of isobutane.

*Example 7*

A complex compound of sodium fluoride and triisobutylaluminum (in mol ratio of 1:2) is subjected to a continuous decomposition process, using the apparatus shown in FIG. 1. The reaction mass was recyclically introduced to the reactor through the inlet pipe 2 at the rate of 95.5 g./min., and triisobutylaluminum was dropped into the reactor 4 heated to 250° C. through the distributor 10 via the inlet pipe 1 at the rate of 4.5 g./min. The silver white aluminum granules produced by the decomposition of the complex compound were sent to the filter 5 along with the flow of the reaction mass, where it was separated from the reaction mass. The filtrate was returned back to the reactor by means of the pump 6. The amount of the gas generated in the course of the decomposition was measured with a gas meter connected to the outlet pipe 9.

The aluminum isolation velocity was 0.61 g./min., the gas generation velocity was 2.3 liters/min., and the composition of gas was 66.8% of isobutylene, 32.3% of hydrogen, and 0.9% of isobutane.

What we claim is:

1. A method for manufacturing aluminum, which comprises heating a complex compound represented by the general formula $(R^1R^2CH-CH_2)_2AlY \cdot E$ to a temperature between 180° and 300° C., $R^1$ and $R^2$ each being selected from the group consisting of hydrogen atom and alkyl radical, Y being selected from the group consisting of hydrogen atom and $R^1R^2CH-CH_2-$ radical, and E being an ether moiety having hydrocarbon radicals and 1 to 3 ethereal oxygen atoms, the total carbon atoms in the ether moiety being 2 to 20.

2. A method according to the claim 1, wherein said alkylaluminum compound is one member of the class consisting of triethylaluminum, triisobutylaluminum and diisobutylaluminum hydride.

3. A method according to the claim 1, wherein said decomposition reaction is carried out in the presence of seed aluminum powder.

4. A method according to the claim 1, wherein said ether is selected from the group consisting of diisobutyl ether, diethyl ether, di-n-butyl ether, anisole, benzyl ethyl ether, diphenyl ether, tetrahydrofuran, and dioxan.

5. A method for continuously manufacturing aluminum which comprises heating a complex compound represented by the general formula $(R^1R^2CH-CH_2)_2AlY \cdot E$ to a temperature between 180° and 300° C. in a heating zone, $R^1$ and $R^2$ each being selected from the group consisting of hydrogen atom and alkyl radical, Y being selected from the group consisting of hydrogen atom and $R^1R^2CH-CH_2-$ radical, and E being an ether moiety having hydrocarbon radicals and 1 to 3 ethereal oxygen atoms, the total carbon atoms in the ether moiety being 2 to 20, and continuously introducing an amount of a fresh alkylaluminum compound corresponding to the amount of alkylaluminum compound moiety in said complex compound consumed in said heating step to the said heating zone, while continuously separating the aluminum produced by the decomposition from the reaction system.

6. A method according to the claim 5, wherein said alkylaluminum compound is one member of the class consisting of triethylaluminum, triisobutylaluminum and diisobutylaluminum hydride.

7. A method according to the claim 5, wherein said decomposition reaction is carried out in the presence of seed aluminum powder.

8. A method according to the claim 5, wherein said separation of aluminum is carried out by drawing out the aluminum deposited at the bottom of the reaction zone, upwardly, leaving the reaction mass in the heating zone.

9. A method according to the claim 5, wherein said ether is selected from the group consisting of diisobutyl ether, diethyl ether, di-n-butyl ether, anisole, benzyl ethyl ether, diphenyl ether, tetrahydrofuran, and dioxan.

10. A method for continuously manufacturing aluminum which comprises heating a complex compound represented by the general formula $(R^1R^2CH-CH_2)_2AlY \cdot E$ in a heating zone to a temperature between 180° and 300° C., $R^1$ and $R^2$ each being selected from the group consisting of hydrogen atom and alkyl radical, Y being selected from the group consisting of hydrogen atom and $R^1R^2CH-CH_2-$ radical, and E being an ether moiety having hydrocarbon radicals and 1 to 3 ethereal oxygen atoms, the total carbon atoms in the ether moiety being 2 to 20, continuously supplying an amount of a fresh alkylaluminum compound corresponding to the amount of the consumed alkylaluminum compound moiety to the heating zone while taking out the aluminum produced by the decomposition from the heating zone together with reaction mass, separating the said aluminum from the said reaction mass, and recycling the said reaction mass into the heating zone to make the complex compound in the heating zone from the ether included in the said reaction mass and the said supplied alkylaluminum compound.

11. A method according to the claim 10, wherein said alkylaluminum compound is one member of the class consisting of triethylaluminum, triisobutylaluminum and diisobutylaluminum hydride.

12. A method according to the claim 10, wherein said decomposition reaction is carried out in the presence of seed aluminum powder.

13. A method according to the claim 10, wherein said ether is selected from the group consisting of diisobutyl ether, diethyl ether, di-n-butyl ether, anisole, benzyl ethyl ether, diphenyl ether, tetrahydrofuran, and dioxan.

14. A method for continuously manufacturing aluminum which comprises heating a complex compound represented by the general formula $(R^1R^2CH-CH_2)_2AlY \cdot E$ in a heating zone to a temperature of 180° to 300° C., $R^1$ and $R^2$ each being selected from the group consisting of hydrogen atom and $$R^1R^2CH-CH_2-$$

radical, and E being an ether moiety having hydrocarbon radicals and 1 to 3 ethereal oxygen atoms, the total carbon atoms in the ether moiety being 2 to 20, supplying an amount of a fresh alkylaluminum compound corresponding to the amount of the consumed alkylaluminum compound moiety into a complex compound forming zone, recycling reaction mass containing the ether into the complex compound forming zone to make the complex compound, continuously supplying thus obtained complex compound to the heating zone, while taking out the aluminum produced by the decomposition from the heating zone together with the reaction mass, separating the aluminum from the said reaction mass and recycling the said reaction mass into the said complex compound forming zone.

15. A method according to claim 14, wherein said alkylaluminum compound is one member of the class consisting of triethylaluminum, triisobutylaluminum and diisobutylaluminum hydride.

16. A method according to claim 14, wherein said decomposition reaction is carried out in the presence of seed aluminum powder.

17. A method according to the claim 14, wherein said ether is selected from the group consisting of diisobutyl ether, diethyl ether, di-n-butyl ether, anisole, benzyl ethyl ether, diphenyl ether, tetrahydrofuran, and dioxan.

References Cited in the file of this patent

UNITED STATES PATENTS 2,843,474 Ziegler _____ July 15, 1958

FOREIGN PATENTS 931,107 Germany _____ Aug. 1, 1955
600,349 Canada _____ June 12, 1960